(12) United States Patent
Sherwood et al.

(10) Patent No.: US 10,739,483 B2
(45) Date of Patent: Aug. 11, 2020

(54) ABSOLUTE STRENGTH AND ABSOLUTE SENSITIVITY IN SEISMIC DATA

(71) Applicant: PGS Geophysical AS, Oslo (NO)

(72) Inventors: John W. C. Sherwood, Houston, TX (US); Kevin J. S. Sherwood, Houston, TX (US)

(73) Assignee: PGS Geophysical AS, Oslo (NO)

( * ) Notice: Subject to any disclaimer, the term of this patent is extended or adjusted under 35 U.S.C. 154(b) by 788 days.

(21) Appl. No.: 15/334,376

(22) Filed: Oct. 26, 2016

(65) Prior Publication Data

US 2018/0113229 A1    Apr. 26, 2018

(51) Int. Cl.
  *G01V 1/30* (2006.01)
  *G01V 13/00* (2006.01)

(52) U.S. Cl.
  CPC ............ *G01V 1/307* (2013.01); *G01V 13/00* (2013.01); *G01V 2210/63* (2013.01); *G01V 2210/72* (2013.01)

(58) Field of Classification Search
  CPC .... G01V 1/307; G01V 13/00; G01V 2210/63; G01V 2210/72
  See application file for complete search history.

(56) References Cited

U.S. PATENT DOCUMENTS 5,287,328 A * 2/1994 Anderson ............... G01V 1/364
                                                    367/38
5,479,376 A * 12/1995 Gonzalez ............... G01V 1/362
                                                    367/47
8,121,791 B2   2/2012 Lazaratos et al.
2010/0220324 A1* 9/2010 Csutak ................... G01D 5/268
                                                    356/364

OTHER PUBLICATIONS

Taner et al., "Surface Consistent Corrections", Geophysics, vol. 46, No. 1, pp. 17-22 (Year: 1981).*
Gardner, et al., "Formation Velocity and Density—The Diagnostic Basics for Stratigraphic Traps"; Geophysics, vol. 39, No. 6, (Dec. 1974) pp. 770-780 (9 Figures) (3 Tables) (11 pgs) http://www.ipt.ntnu.no/pyrex/stash/GPY00770.pdf.
Kelly, et al., "A comparison of Inversion Results for Two Full-waveform Methods that Utilize the Lowest Frequencies in Dual-Sensor Recordings"; SEG Denver 2010 Annual Meeting (5 pgs) https://www.pgs.com/globalassets/technical-library/tech-lib-pdfs/pgs_geostreamer_seg2010_kelly.pdf.
Kelly, et al., "Inversion of Refractions and Reflections by Full-Waveform Inversion for Marine Streamer Data: Classification of Problem Types and Solution Methods"; The Leading Edge—Special Section: Full Waveform Inversion (Sep. 2013) (8 pgs) https://www.pgs.com/globalassets/technical-library/tech-lib-pdfs-v2/tle_kelly_etal_sep_2013_inversionofrefractions.pdf.
Barclay, et al., "Seismic Inversion: Reading Between the Lines"; Oilfield Review, Spring 2008 (22 pgs) http://www.slb.com/~/media/Files/resources/oilfield_review/ors08/spr08/seismic_inversion.pdf.

* cited by examiner

*Primary Examiner* — Ian J Lobo

(57) ABSTRACT

The present disclosure is related to absolute strength and absolute sensitivity in seismic data. Seismic data from a marine survey can be received. The seismic data can be calibrated based on an absolute strength of a seismic source and an absolute sensitivity of a seismic receiver. The calibrated seismic data can be processed.

19 Claims, 3 Drawing Sheets

```
┌─────────────────────────────────────────────────────┐
│  RECEIVING SEISMIC DATA FROM A MARINE SURVEY        │──290
└─────────────────────────────────────────────────────┘
                         │
                         ▼
┌─────────────────────────────────────────────────────┐
│      CALIBRATING THE SEISMIC DATA BASED ON AN       │
│  ABSOLUTE STRENGTH OF A SEISMIC SOURCE AND AN       │──292
│      ABSOLUTE SENSITIVITY OF A SEISMIC RECEIVER     │
└─────────────────────────────────────────────────────┘
                         │
                         ▼
┌─────────────────────────────────────────────────────┐
│        PROCESSING THE CALIBRATED SEISMIC DATA       │──294
└─────────────────────────────────────────────────────┘
```

US 10,739,483 B2

ABSOLUTE STRENGTH AND ABSOLUTE SENSITIVITY IN SEISMIC DATA

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more seismic sources below the sea surface and over a subterranean formation to be surveyed for mineral deposits. Seismic receivers may be located on or near the seafloor, on one or more streamers towed by the marine survey vessel, or on one or more streamers towed by another vessel. The marine survey vessel typically contains marine survey equipment, such as navigation control, seismic source control, seismic receiver control, and recording equipment. The seismic source control may cause the one or more seismic sources, which can be air guns, marine vibrators, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The seismic receivers thereby measure a wavefield that was initiated by the actuation of the seismic source.

DETAILED DESCRIPTION

Figure 1:
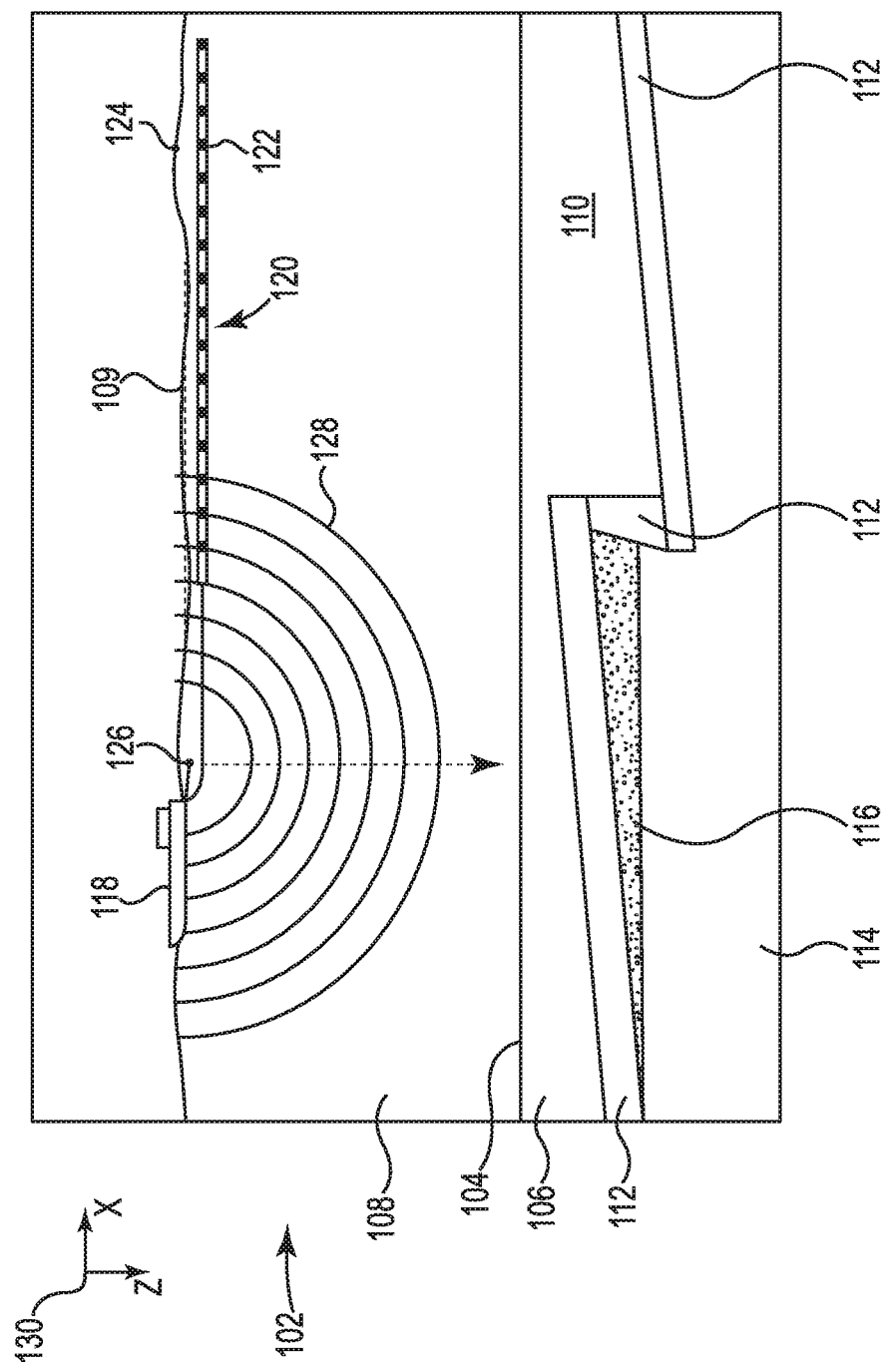
FIG. 1 illustrates an elevation or xz-plane view of marine surveying in which signals are emitted by a source for recording by receivers for processing and analysis in order to help characterize the structures and distributions of features and materials underlying the surface of the earth.

The present disclosure is related to absolute strength and absolute sensitivity in seismic data. Some approaches to seismic processing attempt to maintain amplitude information while estimating and correcting for earth propagation effects such as seismic source and seismic receiver ghosting, geometric spreading, attenuation, velocity dispersion, etc. Many algorithms used in seismic processing, such as migration, attempt to preserve amplitude information. However, to date, the use of absolute amplitude seems to be absent when such algorithms are employed. Some approaches may correct for imperfections in the temporal shape of the seismic source and the response of the seismic receivers and associated instrumentation. However, the actual strength of the seismic source, such as the absolute magnitude of a signal generated by the seismic source, and the absolute sensitivity of the seismic receivers and associated instrumentation are not used. This leads to the processing of the seismic data being non-quantitative and the interpretation of such data lacking quantitative input from the processing. In contrast, the present disclosure uses the absolute strength of the seismic source and the sensitivity of the seismic receiver for the calibration of seismic data. Calibrating the seismic data means that the data is correlated to a quantitative value such as quantitative values of reflectivity, among others.

The present disclosure provides several advantages over some previous approaches to calibrating seismic data. For example, reference to well log information for calibration of the seismic data is not necessary. The deliverable seismic volume produced according to the present disclosure can include physically quantitative frequency band limited reflectivity, as opposed to non-physically quantitative data. A time integrated version of the data produced according to the present disclosure better represents the geology to interpreters of the data. For example, the time integrated version of the data can include a limited frequency band estimate of the natural logarithm of the elastic impedance. Additional advantages include significant improvements in accuracy, resolution, and/or turnaround time for creation of velocity models and improved model building capabilities related to high frequency geologic features.

It is to be understood the present disclosure is not limited to particular devices or methods, which may, of course, vary. It is also to be understood that the terminology used herein is for the purpose of describing particular embodiments only, and is not intended to be limiting. As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

The figures herein follow a numbering convention in which the first digit or digits correspond to the drawing figure number and the remaining digits identify an element or component in the drawing. Similar elements or components between different figures may be identified by the use of similar digits. As will be appreciated, elements shown in the various embodiments herein can be added, exchanged, or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 illustrates an elevation or xz-plane 130 view of marine surveying in which signals are emitted by a source 126 for recording by receivers 122 for processing and analysis in order to help characterize the structures and distributions of features and materials underlying the surface of the earth. Such processing can include qualitatively processing seismic data using an absolute strength of a seismic source and an absolute sensitivity of a seismic receiver. For example, the processing can be used to determine an absolute reflectivity of a subsurface. FIG. 1 shows a domain volume 102 of the earth's surface comprising a subsurface volume 106 of sediment and rock below the surface 104 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 106, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which seismic receivers may be coupled. In one type of marine survey, each seismic receiver, such as the seismic receiver 122 represented by the shaded disk in FIG. 1, comprises a pair of receivers including a geophone that detects particle displacement within the water by detecting particle motion variation, such as velocities or accelerations, and a hydrophone that detects variations in pressure. The streamers 120 and the marine survey vessel 118 can include sensing electronics and data-processing facilities that allow seismic receiver readings to be correlated with absolute positions on the sea surface and absolute three-dimensional positions with respect to a three-dimensional coordinate system. In FIG. 1, the seismic receivers along the streamers are shown to lie below the sea surface 109, with the seismic receiver positions correlated with overlying surface positions, such as a surface position 124 correlated with the position of seismic receiver 122. The marine survey vessel 118 can also tow one or more seismic sources 126 that produce signals as the marine survey vessel 118 and streamers 120 move across the sea surface 109. Seismic sources 126 or streamers 120 may also be towed by other vessels, or may be otherwise disposed in fluid volume 108. For example, seismic receivers may be located on ocean bottom cables or nodes fixed at or near the surface 104, and seismic sources 126 may also be disposed in a nearly-fixed or fixed configuration. For the sake of efficiency, illustrations and descriptions herein show seismic receivers located on streamers, but it should be understood that references to seismic receivers located on a "streamer" or "cable" should be read to refer equally to seismic receivers located on a towed streamer, an ocean bottom receiver cable, or an array of nodes.

FIG. 1 shows an expanding, spherical signal, illustrated as semicircles of increasing radius centered at the source 126, representing a down-going wavefield 128, following a signal emitted by the seismic source 126. The down-going wavefield 128 is, in effect, shown in a vertical plane cross section in FIG. 1. The outward and downward expanding down-going wavefield 128 may eventually reach the surface 104, at which point the outward and downward expanding down-going wavefield 128 may partially scatter, may partially reflect back toward the streamers 120, and may partially refract downward into the subsurface volume 106, becoming elastic signals within the subsurface volume 106.

Figure 2:
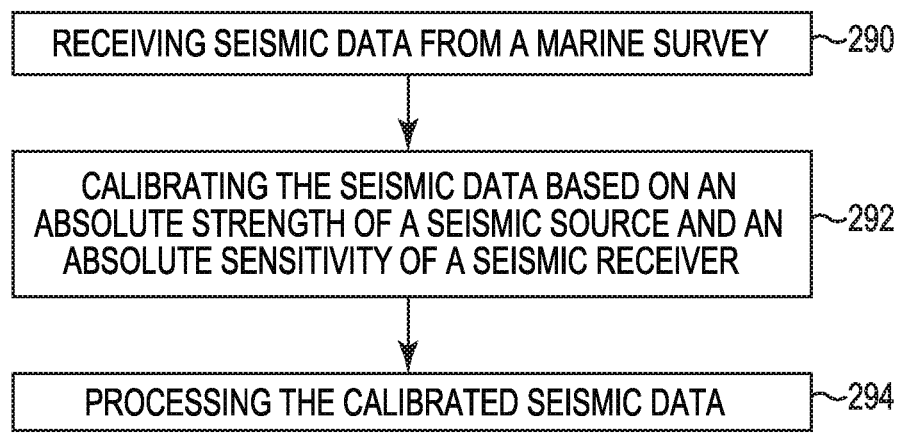
FIG. 2 illustrates a method flow diagram for absolute strength and absolute sensitivity in seismic data.

FIG. 2 illustrates a method flow diagram for absolute strength and absolute sensitivity in seismic data. At block 290, the method can include receiving seismic data from a marine survey. Receiving seismic data can include receiving the seismic data directly from a marine survey, such as by performing the marine survey or receiving the seismic data from a different entity that performed the marine survey. At block 292, the method can include calibrating the seismic data based on an absolute strength of a seismic source and an absolute sensitivity of a seismic receiver. According to some approaches, when a marine survey is conducted, the output of the seismic source is recorded by a seismic receiver, such as a geophone or hydrophone, which turns the recorded signal, which may be pressure, into an electrical signal and stores the recorded value in millivolts. Then, in such approaches, the relative values of such signals may be analyzed without reference to the absolute value of the signal generated by the seismic source or the absolute value of the signal measured by the seismic receiver. With such approaches, relative differences between measurements can be discerned, but no meaning may be attached to individual values. However, according to the present disclosure, the absolute values of the signals generated by the seismic source and the signals measured by the seismic receivers in terms related to pressure are maintained so that the amplitudes associated with values from seismic processing, such as in a seismic image, have independent meaning.

The absolute strength of a seismic source is the quantitative actual magnitude of the strength of the source. The absolute strength is in contrast to a relative strength that has no independent meaning, but only has meaning relative to another value. In at least one embodiment, the absolute strength of the seismic source can be a known quantity for a particular seismic source, such as from information provided by a manufacturer of the seismic source. In at least one embodiment, the absolute strength of the seismic source can be ascertained from testing the seismic source or measuring the output of the seismic source. In at least one embodiment, the absolute strength of the seismic source can be based on a digital three-dimensional model of the seismic source. The absolute strength of the seismic source can be an amplitude of the signal generated by the seismic source in a particular unit. For example, the absolute strength of the seismic source can be a pressure of a wave generated by the seismic source in bars.

The absolute sensitivity of a seismic receiver is the quantitative actual magnitude of the sensitivity of the receiver. The absolute sensitivity is in contrast to a relative sensitivity that has no independent meaning, but only has meaning relative to another value. In at least one embodiment, the absolute sensitivity of the seismic receiver can be a known quantity for a particular seismic receiver, such as from information provided by a manufacturer of the seismic receiver. In at least one embodiment, the absolute sensitivity of the seismic receiver can be ascertained from testing the seismic receiver. The absolute sensitivity of the seismic receiver can be related to an amplitude of the signal measured by the seismic receiver in a particular unit. For example, the absolute sensitivity of the seismic receiver can be a related to the pressure of a wave measured by the seismic receiver in millivolts/bar.

Calibrating the seismic data can include calibrating the seismic data without using well log information. Well log information is information received from a previously drilled well. It can include a record of geologic formations penetrated by a borehole and can be based on visual inspection, samples brought to the surface, or on physical measurements made by instruments lowered into the hole. According to some approaches, this information can be used to calibrate seismic data from marine surveys in the area of the previously drilled well. However, the further away from the well the survey site is, the less reliable the well log information may be for calibrating the seismic data. For example, a range of a few hundred meters may be the extent of any reliability of the well log information. However, according to the present disclosure, the seismic data can be calibrated based on the absolute strength of the seismic source and the absolute sensitivity of the seismic receiver rather than well log information, which can reduce the dependency on the existence of well log information or a proximity of a marine survey to an existing well.

De-signature is a process of designing, and subsequently applying to the seismic data, an inverse filter to change a signature to have an appropriate frequency band limited spectrum, with unit amplitude in the pass band and with zero phase. For source de-signature, the signature can include a temporal shape for the seismic source. Different seismic sources, such as air guns, can have different shapes or sizes, and those shapes or sizes can change during operation. For example, the shapes or sizes can change due to changes in temperature of the water, changes in temperature of the seismic source, such as from previous actuations, etc. In at least one embodiment, the shape or size of the seismic source can be modeled, the pressure output of the seismic source can be modeled, and the pressure output of the seismic source can be scaled according to a change in shape or size of the seismic source over time, which can also be modeled. In such an embodiment, the absolute amplitude of a signal generated by the seismic source can be referred to as an estimate, because it can change over time and the model can estimate that change. According to at least one embodiment of the present disclosure, calibrating the seismic data based on the absolute strength of the seismic source can include scaling a temporal shape of the seismic source to an estimate of an absolute amplitude of a pressure signal (e.g., in bars) generated by the seismic source. Calibrating the seismic data based on the absolute sensitivity of the seismic receiver (e.g., in mV/bar) can include a de-signature operation where the signature (e.g., in mV) as a function of frequency is the absolute amplitude and phase response of the seismic receiver and instrumentation to a zero phase, unit amplitude pressure (e.g., in bars). Such instrumentation can include physical, electrical, or optical cabling, streamers, data recording equipment, data transmission equipment, etc.

At block 294, the method can include processing the calibrated seismic data. Embodiments are not limited to a particular result of processing the seismic data. The seismic data can be processed to produce any useful result. One example of processing the seismic data can include creating a broadband velocity model of subsurface geologic features as described in more detail below. A velocity model is a map of the subsurface indicating velocities of waves at various locations in the subsurface. A broadband velocity model can include a combination of a low frequency velocity model (e.g., from tomography) and high frequency seismic data. As used herein, low frequency includes frequencies up to about two Hertz, whereas high frequencies include frequencies of about four Hertz and above. There may be a frequency gap between the seismic data and the velocity model, such as in the two to four Hertz range. Some approaches may attempt to fill in this gap with information from well logs.

Processing the calibrated seismic data can include determining a physically quantitative frequency band limited seismic volume of a subsurface in absolute units, such as absolute reflectivity units. The data produced (the seismic volumes) can be presented in an integrated form, such as a frequency band limited estimate of the natural logarithm of an elastic impedance of the subsurface. An example of elastic impedance is density multiplied by P-wave velocity perpendicular to the bedding, which can be referred to as normal incidence impedance or as acoustic impedance. Reflectivity can be related to the natural logarithm of elastic impedance. With approximation, for normal incidence plane waves through layers, reflectivity $R(t)$ for primary reflections can be expressed as a function of time as $2*R(t)=d\{\ln[D(t)*V(t)]\}/dt$, where $D$ is density, $V$ is P-wave velocity, and $t$ is time. Integrating with respect to time yields $2*I(t)=\ln[D(t)*V(t)]+C$, where $I(t)$ is reflectivity $R(t)$ integrated with respect to time and $C$ is a constant. These relationships can be maintained for filter operations in time, such as frequency band limitation whereby the constant $C$ becomes irrelevant. The small shot to receiver offset part of such calibrated surface seismic data, $2*I(t)=\ln[D(t)*V(t)]$, can be imaged in depth via a seismic migration process to form a spatial seismic volume corresponding to normal incidence angle at the subsurface reflectors. Such a seismic volume may be defined as "relative elastic P-wave impedance" as a shortened terminology for "frequency band limited natural logarithm of elastic P-wave impedance". With inclusion of larger shot to receiver offsets, amplitude versus offset (AVO), amplitude versus incident angle (AVA), amplitude versus azimuth (AVAz) inversions can be applied via depth migrations of the time integrated calibrated seismic data to form estimates of "relative elastic impedance" for both P-waves and SV-waves. P-waves are compressional waves also known as primary waves. In P-waves, particle motion is dominantly parallel to the direction of wave propagation. SV-waves can be shear wave reflections generated due to an incident P-wave. In SV-waves, particle motion is dominantly perpendicular to the direction of wave propagation and polarized in the plane of reflection. The P-wave and SV-wave "relative elastic impedances" can be transformed to various "relative elastic moduli" important for relative rock physics and the quantitative interpretation of seismic data. There is a major advantage to forming such calibrated seismic volumes without the need for actual well logs and other advantages will be apparent to those skilled in the art. However, embodiments of the present disclosure do not preclude such calibrated seismic volumes from being adjusted later should well logs become available.

The calibrated "relative P-wave relative impedance" can be approximated to "relative P-wave velocity" by assuming Gardner's Law relating density to P-wave velocity: ($D=aV^{1/4}$), where $D$ is density, $V$ is P-wave velocity, and $a$ is a constant that depends on geology. This may also be referred to herein as estimating a frequency band limited natural logarithm of P-wave velocity for high frequencies. This seismic volume can be combined with the low frequency velocity model from tomography in order to form a broadband velocity model. The calibration can enable getting a correct magnitude for the "relative P-wave velocity", again assuming Gardner's Law. Without the calibration one would have to make a guess at a calibration scalar value.

In accordance with a number of embodiments of the present disclosure, a geophysical data product may be manufactured. Geophysical data may be received and stored on a non-transitory, tangible computer-readable medium. The geophysical data product may be manufactured by processing the geophysical data offshore or onshore either within the United States or in another country. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore. The geophysical data can be calibrated based on an absolute strength of a seismic source and an absolute sensitivity of a seismic receiver, for example, as the geophysical data is being acquired or after it is acquired, offshore to facilitate other processing of the marine survey data either offshore or onshore. The calibrated geophysical data can be processed to generate the geophysical data product, for example, as the geophysical data is being acquired or after it is acquired, offshore to facilitate other processing of the marine survey data either offshore or onshore.

Figure 3:
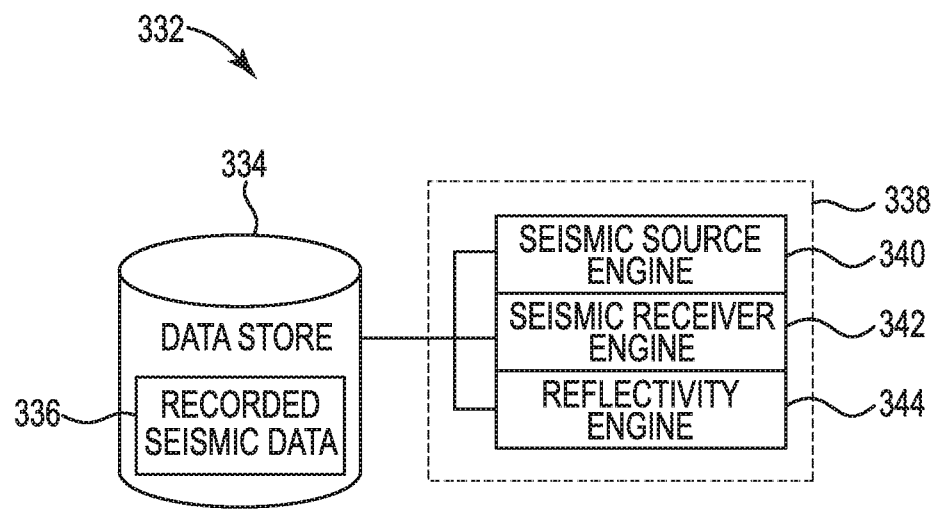
FIG. 3 illustrates a diagram of a system for absolute strength and absolute sensitivity in seismic data.

FIG. 3 illustrates a diagram of a system for absolute strength and absolute sensitivity in seismic data. The system 332 can include a data store 334, a subsystem 338, and a number of engines (e.g., seismic source engine 340, seismic receiver engine 342, and reflectivity engine 344) and can be in communication with the data store 334 via a communication link. The data store 334 can store recorded seismic data 336 from a marine survey. The system 332 can include additional or fewer engines than illustrated to perform the various functions described herein. The system can represent program instructions and/or hardware of a machine (e.g., machine 446 as referenced in FIG. 4, etc.). As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, as well as hard-wired program such as logic. Hard-wired program instructions can be considered as both program instructions and hardware.

The seismic source engine 340 can include a combination of hardware and program instructions that is configured to calibrate the recorded seismic data 336 based on an absolute strength of a seismic source. In at least one embodiment, the recorded seismic data 336 can be recorded in millivolts. The seismic source engine 340 can be configured to scale the seismic source temporal shape to an estimate of the absolute amplitude of a signal generated by the seismic source. For example with respect to processing correction for wavefield divergence, the signal generated by the seismic source can be provided at the divergence reference distance in units of pressure, such as bars.

The seismic receiver engine 342 can include a combination of hardware and program instructions that is configured to calibrate the recorded seismic data 336 based on an absolute sensitivity of a seismic receiver. The seismic receiver engine 342 can be configured to scale a seismic receiver and associated instrumentation response to absolute units of electric potential per unit pressure. For example, the sensitivity of the seismic receiver can be in units of millivolts/bar.

The reflectivity engine 344 can include a combination of hardware and program instructions that is configured to process the calibrated seismic data to determine an absolute reflectivity of a subsurface. For example, the reflectivity engine 344 can be configured to process the calibrated seismic data to determine a physically quantitative frequency band limited seismic volume of a subsurface in absolute units, such as absolute reflectivity units, as described herein.

Figure 4:
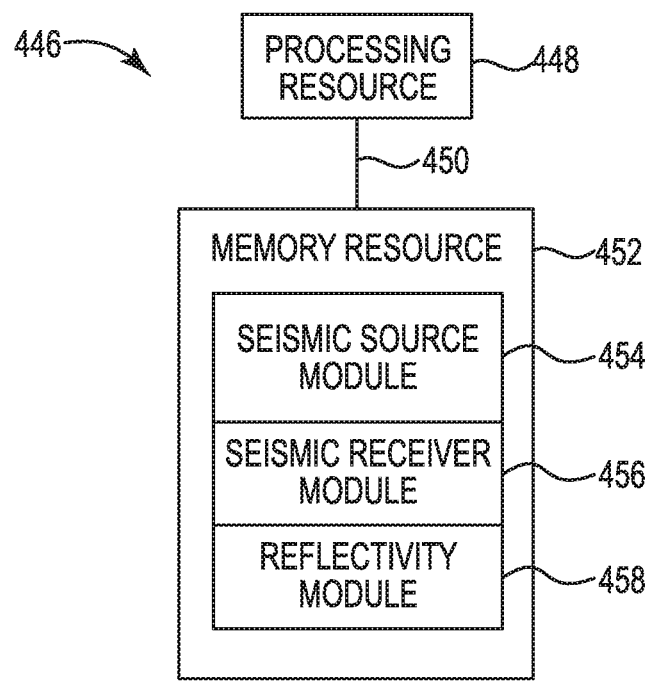
FIG. 4 illustrates a diagram of a machine for absolute strength and absolute sensitivity in seismic data.

FIG. 4 illustrates a diagram of a machine for absolute strength and absolute sensitivity in seismic data. The machine 446 can utilize software, hardware, firmware, and/or logic to perform a number of functions. The machine 446 can be a combination of hardware and program instructions configured to perform a number of functions (e.g., actions). The hardware, for example, can include a number of processing resources 448 and a number of memory resources 452, such as a machine-readable medium or other non-transitory memory resources 452. The memory resources 452 can be internal and/or external to the machine 446, for example, the machine 446 can include internal memory resources and have access to external memory resources. The program instructions, such as machine-readable instructions, can include instructions stored on the machine-readable medium to implement a particular function, for example, an action such as quantitatively processing seismic data using an absolute strength of a seismic source and an absolute sensitivity of a seismic receiver. The set of machine-readable instructions can be executable by one or more of the processing resources 448. The memory resources 452 can be coupled to the machine 446 in a wired and/or wireless manner. For example, the memory resources 452 can be an internal memory, a portable memory, a portable disk, and/or a memory associated with another resource, for example, enabling machine-readable instructions to be transferred or executed across a network such as the Internet. As used herein, a "module" can include program instructions and/or hardware, but at least includes program instructions.

Memory resources 452 can be non-transitory and can include volatile and/or non-volatile memory. Volatile memory can include memory that depends upon power to store data, such as various types of dynamic random access memory among others. Non-volatile memory can include memory that does not depend upon power to store data. Examples of non-volatile memory can include solid state media such as flash memory, electrically erasable programmable read-only memory, phase change random access memory, magnetic memory, optical memory, or a solid state drive, etc., as well as other types of non-transitory machine-readable media.

The processing resources 448 can be coupled to the memory resources 452 via a communication path 450. The communication path 450 can be local or remote to the machine 446. Examples of a local communication path 450 can include an electronic bus internal to a machine, where the memory resources 452 are in communication with the processing resources 448 via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path 450 can be such that the memory resources 452 are remote from the processing resources 448, such as in a network connection between the memory resources 452 and the processing resources 448. That is, the communication path 450 can be a network connection. Examples of such a network connection can include a local area network, wide area network, personal area network, and the Internet, among others.

As shown in FIG. 4, the machine-readable instructions stored in the memory resources 452 can be segmented into a number of modules 454, 456, 458 that when executed by the processing resources 448 can perform a number of functions. As used herein a module includes a set of instructions included to perform a particular task or action. The number of modules 454, 456, 458 can be sub-modules of other modules. For example, the seismic source module 454 can be a sub-module of the seismic receiver module 456 or the seismic source module 454 and the seismic receiver module 456 can be contained within a single module. Furthermore, the number of modules 454, 456, 458 can comprise individual modules separate and distinct from one another. Examples are not limited to the specific modules 454, 456, 458 illustrated in FIG. 4.

Each of the number of modules 454, 456, 458 can include program instructions or a combination of hardware and program instructions that, when executed by a processing resource 448, can function as a corresponding engine as described with respect to FIG. 3. For example, the seismic source module 454 can include program instructions or a combination of hardware and program instructions that, when executed by a processing resource 448, can function as the seismic source engine 340, the seismic receiver module 456 can include program instructions or a combination of hardware and program instructions that, when executed by a processing resource 448, can function as the seismic receiver engine 342, or the reflectivity module 458 can include program instructions or a combination of hardware and program instructions that, when executed by a processing resource 448, can function as the reflectivity engine 344.

The machine 446 can include a seismic source module 454, which can include instructions to calibrate seismic data based on an absolute strength of a seismic source. The instructions to calibrate the seismic data can include instructions to calibrate the seismic data before it is processed. The instructions to calibrate the seismic data based on the absolute strength of the seismic source can include instructions to scale the seismic source temporal signature to an estimate of an absolute amplitude of a signal generated by the seismic source, such as an absolute pressure of a signal generated by the seismic source.

The machine 446 can include a seismic receiver module 456, which can include instructions to calibrate seismic data based on an absolute sensitivity of a seismic receiver. The instructions to calibrate the seismic data can include instructions to calibrate the seismic data before it is processed. The instructions to calibrate the seismic data based on the absolute sensitivity of the seismic receiver can include instructions to scale a seismic receiver and associated instrumentation response to absolute units of electric potential per unit pressure (mV/bar).

The machine 446 can include a reflectivity module 458, which can include instructions to quantitatively process calibrated seismic data. Quantitative processing can be done so that the output of the processing is already quantitatively relevant (rather than having to scale the output of non-quantitative processing, where errors may propagate). Quantitatively processing seismic data is analogous to processing seismic data using absolute values of the seismic data. In at least one embodiment, the instructions to quantitatively process the seismic data can be instructions to quantitatively process the seismic data after the seismic data has been calibrated (e.g., by the seismic source module 454 and/or by the seismic receiver module 456). The reflectivity module 458 can include instructions to process the calibrated seismic data to determine an absolute reflectivity of a subsurface.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein.

Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method, comprising:
   receiving seismic data from a marine survey, wherein the seismic data comprises a recorded electrical signal in units of electrical potential;
   calibrating the seismic data based on an absolute strength of a seismic source in units of pressure;
   calibrating the seismic data based on an absolute sensitivity of a seismic receiver in units of electrical potential per unit pressure; and
   processing the calibrated seismic data to determine a physically quantitative frequency band limited seismic volume of a subsurface in absolute units.

2. The method of claim 1, wherein calibrating the seismic data comprises calibrating the seismic data without using well log information.

3. The method of claim 1, wherein processing the calibrated seismic data comprises creating a velocity model of subsurface geologic features.

4. The method of claim 1, wherein calibrating the seismic data based on the absolute strength of the seismic source comprises scaling a temporal shape of the seismic source to an estimate of an absolute amplitude of a signal generated by the seismic source.

5. The method of claim 4, further comprising processing correction for wavefield divergence by providing the signal generated by the seismic source at a divergence reference distance in units of pressure.

6. The method of claim 1, wherein calibrating the seismic data based on the absolute sensitivity of the seismic receiver comprises scaling a response of the seismic receiver and instrumentation associated with the seismic receiver to the absolute sensitivity of the seismic receiver and the instrumentation associated with the seismic receiver.

7. The method of claim 6, wherein calibrating the seismic data based on the absolute sensitivity of the seismic receiver includes a de-signature operation where a signature in units of electrical potential as a function of frequency is an absolute amplitude and phase response of the seismic receiver and instrumentation to a zero phase, unit amplitude pressure.

8. The method of claim 1, wherein the method includes:
   conducting the marine survey;
   wherein receiving seismic data from a marine survey comprises:
      receiving the seismic data as a result of conducting the marine survey; and
      recording the seismic data.

9. A system, comprising:
recorded seismic data in units of electrical potential;
a seismic source engine configured to calibrate the recorded seismic data based on an absolute strength of a seismic source in units of pressure;
a seismic receiver engine configured to calibrate the recorded seismic data based on an absolute sensitivity of a seismic receiver in units of electrical potential per unit pressure; and
a reflectivity engine configured to process the calibrated seismic data to determine a physically quantitative frequency band limited seismic volume of a subsurface in absolute reflectivity units.

10. The system of claim 9, wherein the reflectivity engine is configured to form a frequency band limited estimate of the natural logarithm of an elastic impedance of the subsurface.

11. The system of claim 10, wherein the reflectivity engine is configured to use absolute amplitudes to create a velocity model.

12. The system of claim 9, wherein the calibrated seismic data comprises recorded seismic data as calibrated by the seismic source engine and the seismic receiver engine.

13. A non-transitory machine-readable medium storing instructions executable by a processing resource to:
calibrate seismic data, comprising a recorded electrical signal, based on an absolute strength of the seismic source in units of pressure;
calibrate the seismic data based on an absolute sensitivity of the seismic receiver in units of electrical potential per unit pressure; and
quantitatively process the calibrated seismic data to determine a physically quantitative frequency band limited seismic volume of a subsurface in absolute reflectivity units.

14. The medium of claim 13, wherein the instructions to calibrate the seismic data based on the absolute strength of the seismic source comprise instructions to scale a temporal shape of the seismic source to an estimate of an absolute amplitude of a signal generated by the seismic source.

15. The medium of claim 14, wherein the signal generated by the seismic source comprises a pressure signal.

16. The medium of claim 13, including instructions executable to calibrate the seismic data based on the absolute sensitivity of the seismic receiver before processing the seismic data.

17. The medium of claim 16, wherein the instructions to calibrate the seismic data comprise instructions to scale a seismic receiver and associated instrumentation response to absolute units of electric potential per unit pressure.

18. A method of generating a geophysical data product, the method comprising:
receiving seismic data comprising a recorded electrical signal in units of electrical potential;
calibrating the seismic data based on an absolute strength of a seismic source in units of pressure;
calibrating the seismic data based on an absolute sensitivity of a seismic receiver in units of electrical potential per unit pressure;
processing the calibrated seismic data to generate processed calibrated seismic data comprising a physically quantitative frequency band limited seismic volume of a subsurface in absolute units; and
recording the processed calibrated seismic data on one or more non-transitory machine-readable media thereby creating the geophysical data product.

19. The method of claim 18, wherein processing the geophysical data comprises processing the geophysical data offshore or onshore.

* * * * *